(12) United States Patent
Clarke et al.

(10) Patent No.: US 9,438,657 B2
(45) Date of Patent: *Sep. 6, 2016

(54) EFFICIENT VIDEO DELIVERY

(71) Applicant: TATA COMMUNICATIONS (AMERICA) INC., Herndon, VA (US)

(72) Inventors: Donald Peregrine Clarke, Gilroy, CA (US); Edward Deitz Crump, Santa Cruz, CA (US); Barrett Gibson Lyon, Pacifica, CA (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,363

(22) Filed: May 12, 2015

(65) Prior Publication Data

US 2015/0244762 A1 Aug. 27, 2015

Related U.S. Application Data

(63) Continuation of application No. 14/147,854, filed on Jan. 6, 2014, now abandoned, which is a continuation of application No. 11/986,682, filed on Nov. 21, 2007, now Pat. No. 8,656,442.

(51) Int. Cl.

| H04N 7/173 | (2011.01) |
|---|---|
| H04L 29/06 | (2006.01) |
| H04N 21/2343 | (2011.01) |
| H04N 21/643 | (2011.01) |
| H04N 21/6437 | (2011.01) |
| H04N 21/845 | (2011.01) |
| G06F 17/30 | (2006.01) |

(52) U.S. Cl.
CPC ....... *H04L 65/608* (2013.01); *G06F 17/30076* (2013.01); *G06F 17/30203* (2013.01); *G06F 17/30781* (2013.01); *H04L 65/4084* (2013.01); *H04L 65/605* (2013.01); *H04L 67/42* (2013.01); *H04N 21/2343* (2013.01); *H04N 21/6437* (2013.01); *H04N 21/64322* (2013.01); *H04N 21/8456* (2013.01)

(58) Field of Classification Search
CPC .................. H04N 21/2343; H04N 21/64322; H04N 21/6437; H04N 21/8456; H04L 65/608; H04L 65/605; H04L 65/4084; H04L 67/42; G06F 17/30076; G06F 17/30203; G06F 17/30781
See application file for complete search history.

(56) References Cited

U.S. PATENT DOCUMENTS

| 5,928,331 | A | 7/1999 | Bushmitch |
|---|---|---|---|
| 6,389,473 | B1 | 5/2002 | Carmel et al. |
| 6,941,378 | B2 | 9/2005 | Apostolopoulos et al. |
| 7,818,355 | B2 | 10/2010 | Mills et al. |
| 8,060,909 | B2 | 11/2011 | Krikorian et al. |
| 2005/0243868 | A1* | 11/2005 | Tamai ............ H04L 29/06027 370/476 |
| 2006/0174276 | A1 | 8/2006 | Derrenberger et al. |
| 2007/0089151 | A1* | 4/2007 | Moore ............... G11B 27/037 725/132 |
| 2007/0107032 | A1* | 5/2007 | Rachamadugu . G08B 13/19613 725/114 |
| 2007/0157280 | A1 | 7/2007 | Michael et al. |
| 2007/0162945 | A1 | 7/2007 | Mills |
| 2008/0091842 | A1 | 4/2008 | Blumrich et al. |

(Continued)

*Primary Examiner* — Oschta Montoya
(74) *Attorney, Agent, or Firm* — Hubbs, Enatsky & Inoue PLLC

(57) ABSTRACT

Efficient video delivery is disclosed. In some embodiments, at least a part of a video stream received from a video source is converted to a dividable video format file. The dividable video format file is split into a sequence of small files, and one or more of the sequence of small files is published.

20 Claims, 7 Drawing Sheets

(56) References Cited

U.S. PATENT DOCUMENTS

| | | |
|---|---|---|
| 2008/0091845 A1 | 4/2008 | Mills et al. |
| 2008/0126515 A1 | 5/2008 | Chambers et al. |
| 2008/0165960 A1* | 7/2008 | Woo .................. G06F 17/30781 380/201 |
| 2008/0235200 A1 | 9/2008 | Washington et al. |
| 2009/0013414 A1 | 1/2009 | Washington et al. |
| 2009/0025047 A1* | 1/2009 | Choi .................. H04N 7/17318 725/91 |
| 2009/0055878 A1* | 2/2009 | Hersent ............. H04L 29/06027 725/93 |
| 2009/0319557 A1* | 12/2009 | Lipka .................. H04L 12/1881 |

* cited by examiner

EFFICIENT VIDEO DELIVERY

CROSS-REFERENCE TO RELATED APPLICATION

This application is a continuation of U.S. patent application Ser. No. 14/147,854 filed Jan. 6, 2014 which is a continuation of Ser. No. 11/986,682 filed on Nov. 21, 2007, now U.S. Pat. No. 8,656,442 issued on Feb. 18, 2014, the entire contents of which are incorporated herein by reference.

BACKGROUND OF THE INVENTION

Techniques for providing canned video files to clients using reliable communication protocols such as Hypertext Transfer Protocol (HTTP), Transmission Control Protocol (TCP), Internet Protocol (IP), etc., exist. Techniques for real time video delivery to clients also exist. However, existing techniques for real time video delivery suffer from reliability and scalability issues. FIG. 1 is a diagram illustrating a typical network environment 100 for real time video delivery. Video data generated by camera 102 is converted into a Real Time Streaming Protocol (RTSP) format by RTSP server 104 and delivered as an RTSP stream over a network 106 to one or more clients 108. Due in part to the stateful nature of RTSP, existing techniques for scaling an RTSP stream for delivery to a large number of clients are inefficient and in some cases unreliable. Server 104 can support providing the RTSP stream to only a relatively small number of clients 108, with the quality of the delivered RTSP stream often degrading as the number of clients being served increases. Moreover, existing techniques for distributing an RTSP stream to multiple nodes of a content delivery network (CDN) are unduly complex and inefficient. As such, improvements to real time video delivery are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient video delivery is disclosed. In some embodiments, at least a part of a video stream received from a video source is converted to a dividable video format file. The dividable video format file is split into a sequence of small files, and one or more of the sequence of small files is published.

Although real time video delivery is described in many of the given examples, the techniques disclosed herein are not limited to real time video delivery. Rather, the disclosed techniques are applicable to the delivery of any type of raw data, i.e. data that has not been packaged and/or containered into a format for easy distribution using reliable protocols such as HTTP, TCP, TCP/IP, etc. In some embodiments, the techniques disclosed herein may be employed with internet telephony. Although many of the examples described herein are with respect to a CDN, the techniques disclosed herein may be employed with respect to any client-server configuration. As used herein, video or video data may include any type of multimedia content, such as text, audio, images, video, animation, graphics, interactive content, etc.

Figure 1:
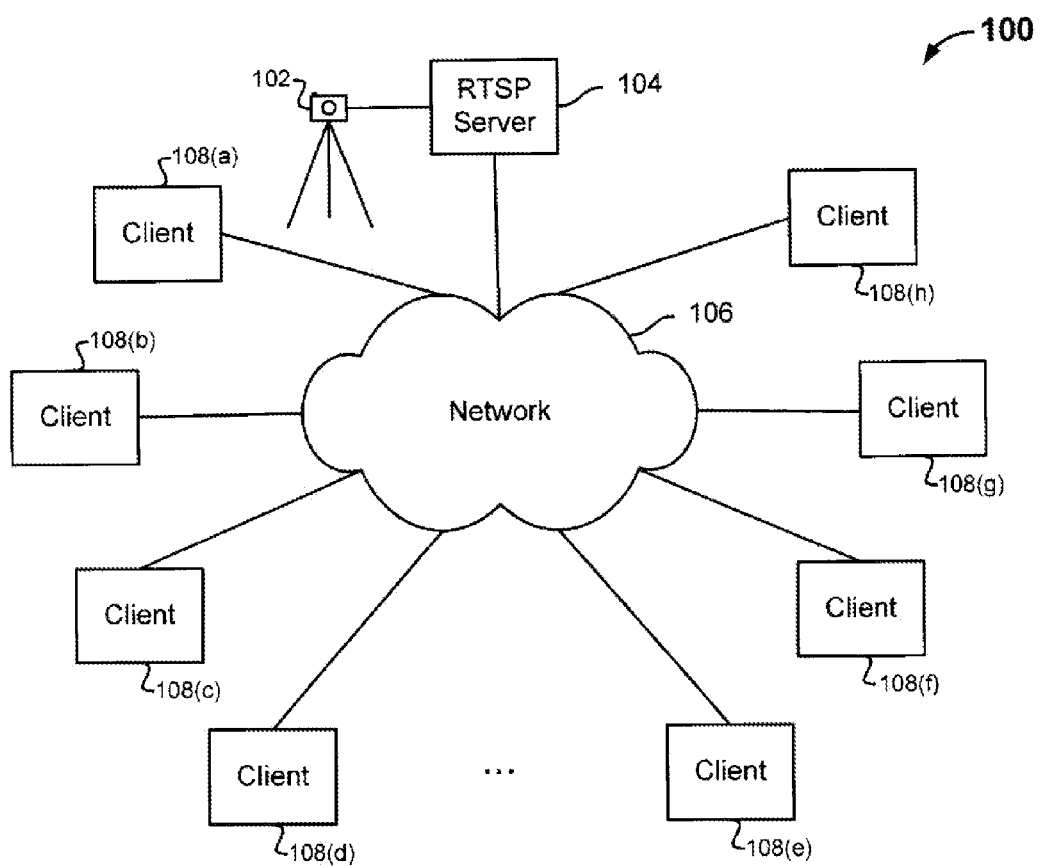
FIG. 1 is a diagram illustrating a typical network environment for real time video delivery.
Figure 2:
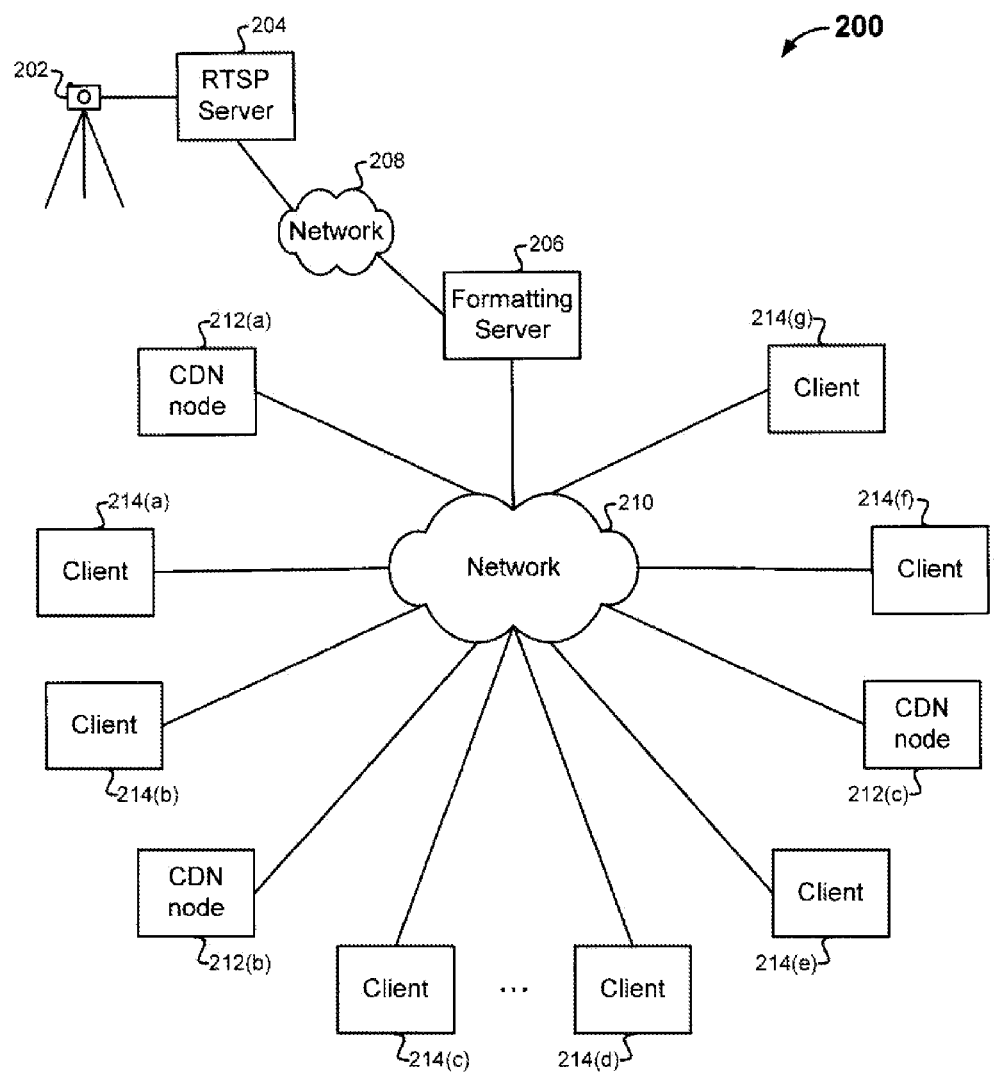
FIG. 2 is a diagram illustrating an embodiment of a network environment for real time video delivery.

FIG. 2 is a diagram illustrating an embodiment of a network environment 200 for real time video delivery. In the given example, a video feed or stream generated by camera 202 is converted into an RTSP format by RTSP server 204 and provided as an RTSP stream to formatting server 206 via network 208. In some embodiments, formatting server 206 is part of a CDN. Camera 202, for example, may be associated with a news service that publishes live video data generated by camera 202 via RTSP server 204 as an RTSP stream. In other embodiments, any other appropriate configuration for providing or publishing the video stream generated by a video source, either in the format generated by camera 202 or as an RTSP stream or other real time streaming video format (e.g., Real Time Messaging Protocol (RTMP)), to formatting server 206 may be employed. In some cases, a video source such as camera 202 may be directly connected to formatting server 206 via, for example, Firewire, Quicktime API framework, Microsoft DirectShow, etc., and the video data may be encoded into a general protocol that a CDN can redistribute.

In the given example, formatting server 206 converts a video stream, such as an RTSP stream, into a format that can be reliably distributed over a network 210 to a plurality of nodes 212 of an associated CDN so that the video stream can be efficiently delivered to any number of clients 214. In various embodiments, each of networks 208 and 210 comprises a public or private network, such as a LAN, WAN, the Internet, etc., and networks 208 and 210 may be parts of the same network or different networks. In some embodiments, as described in more detail below, formatting server 206 converts a real time video stream into a sequence of small (e.g., Flash) files that is distributed to one or more nodes 212 of a CDN. In some embodiments, when the video stream is requested by a client 214 from a node 212, the small files are sequentially provided to the client 214 by the node 212 in the correct order. In some embodiments, when the video stream is requested by a client 214 from a node 212, the small files are provided by the node 212 to the client 214 and are ordered into the correct sequence client-side. In some embodiments, a request from a client 214 for the video stream is serviced by an available node 212 that is geographically closest to the client 214.

Regardless of the manner in which the sequence of small files comprising the video stream is provided to a client 214, in some embodiments, the client 214 believes it is receiving (parts of) a single file. In some embodiments, a live or real time video stream being generated by camera 202 is delivered to one or more requesting clients 214 as a single file of unspecified size that comprises the sequence of small files into which the stream is being divided into by formatting server 206. Efficient distribution of a video stream across a network to one or more servers and/or clients is in some cases possible by delivering the video data as a file and/or a sequence of small files using reliable communication protocols such as HTTP, TCP, TCP/IP, etc., rather than delivering the video data in a real time streaming format such as RTSP or RTMP.

Figure 3:
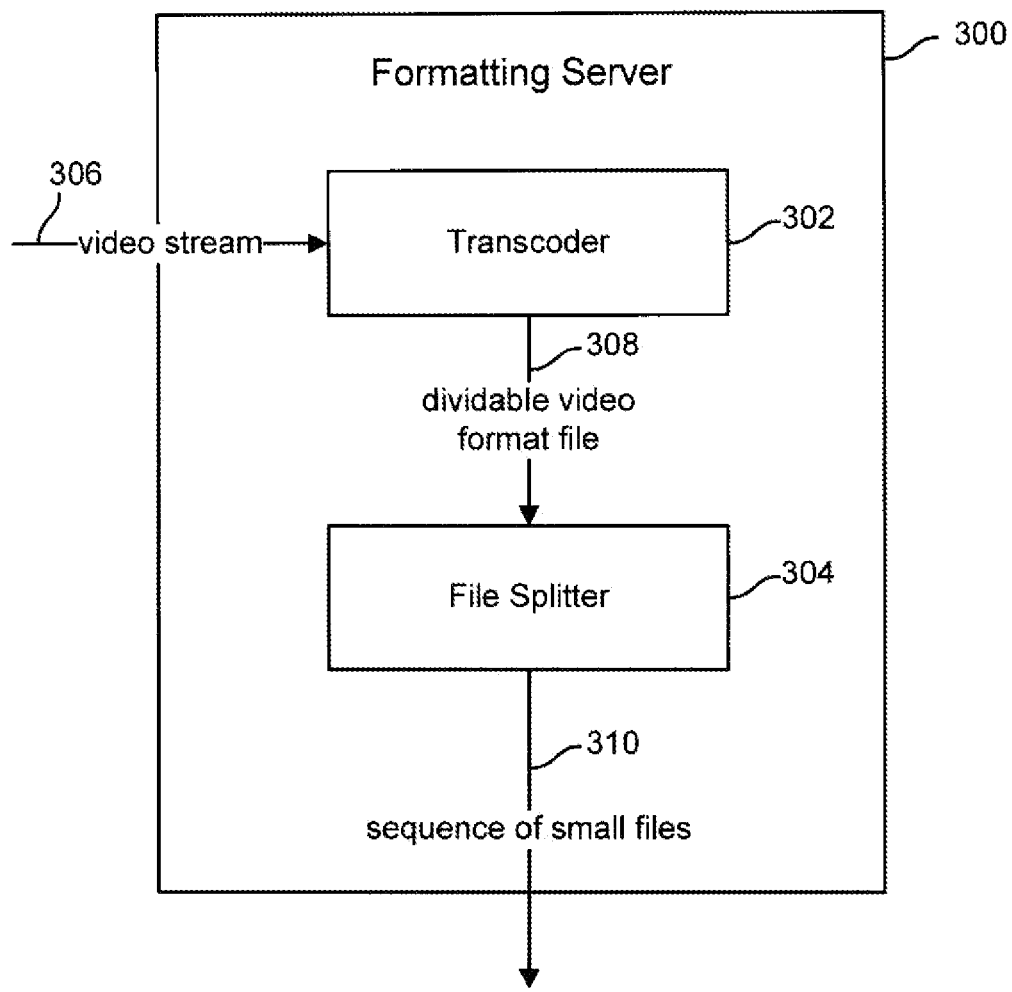
FIG. 3 illustrates an embodiment of a formatting server.

FIG. 3 illustrates an embodiment of a formatting server 300. In some embodiments, formatting server 300 corresponds to formatting server 206 of FIG. 2. As depicted, formatting server 300 includes transcoder 302 and file splitter 304. In some embodiments, transcoder 302 comprises a VLC media player. In other embodiments, any other appropriate type of transcoder 302 may be employed, such as FFmpeg, MEncoder, raw custom transcoder software such as On2 VP6, etc. An input video stream 306 (e.g., in a real time streaming format such as RTSP) is converted by transcoder 302 into a desired dividable video format file 308, such as Flash FLV, MPEG-2, MP4, etc. A dividable video format is a format that is amenable to being divided and later reassembled. In some embodiments, a dividable video format is resilient to errors. For example, a dividable video format file comprised of key frames and updates to the key frames is resilient to error since each key frame provides a re-synchronization point for the video data.

In the case of a live or real time input video stream 306, the size and/or length of the input video stream 306 is unknown. In some such cases, formatting server 300 continues receiving input video stream 306 and transcoder 302 continues transcoding input video stream 306 and including the transcoded data in file 308 until, for example, input video stream 306 ends. In some embodiments, file 308 comprises a header attached by transcoder 302 to the beginning of the file and sequentially transcoded video stream data thereafter. In some cases, file 308 comprises a continuously growing or expanding file as input video stream data 306 is transcoded by transcoder 302 and included in file 308.

As depicted in the given example, file 308 is input into file splitter 304 which splits or divides file 308 into a sequence of smaller files 310. In some embodiments the header attached to file 308 by transcoder 302 indicates the start of file 308 to file splitter 304 and is stripped or removed by file splitter 304 before it sequentially splits the data included in file 308. File 308 may be split by file splitter 304 in any appropriate manner. For example, file 308 may be split by file splitter 304 in a manner that allows easy reassembly of the pieces 310 into which file 308 is split, file 308 may be split by file splitter 304 in a manner that allows easy replication of the small files 310 across a CDN, etc. In various embodiments, file 308 may be split into small files 310 of a prescribed size (e.g., 100 KB), a prescribed time duration (e.g., 15 seconds), etc. In some embodiments, file 308 is split at key frames. File 308 is continued to be split into smaller pieces or files 310 as it is being generated by transcoder 302 as video stream 306 is received. In some embodiments, the file name or other associated identifier of each of the smaller files 310 into which file 308 is split includes a sequence number so that the smaller files 310 can be provided and/or arranged in the correct order.

Thus, as depicted in FIG. 3, the input to formatting server 300 comprises a video stream 306, and the output comprises a plurality of small files 310. In some embodiments, the plurality of small files 310 generated by formatting server 300 is distributed to one or more nodes of a CDN, e.g., using one or more reliable communication protocols. For example, for near real time delivery of a live video stream to one or more clients, the small files 310 generated by formatting server 300 are distributed to one or more nodes of an associated CDN as they are generated, i.e., as file 308 is being generated from video stream 306 and split into small files 310.

Figure 4:
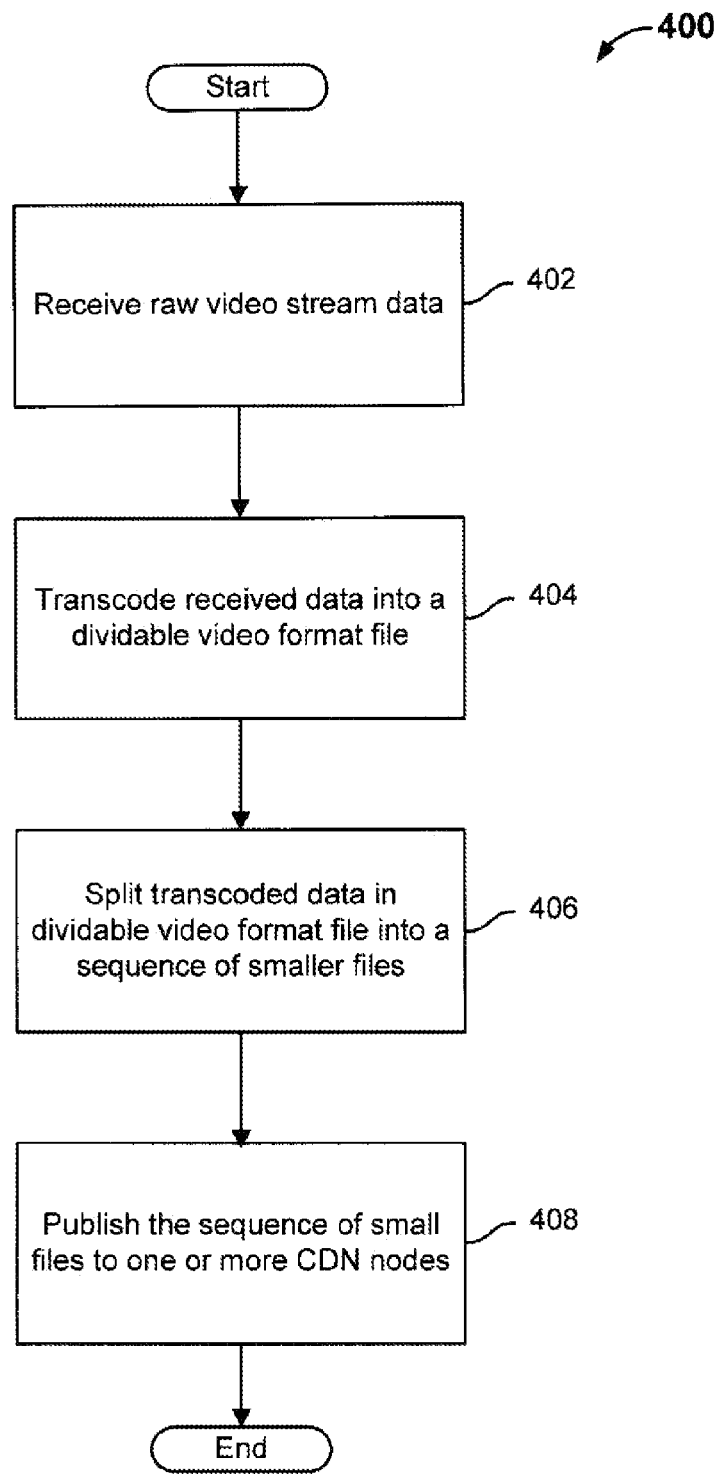
FIG. 4 illustrates an embodiment of a process for formatting and publishing video stream data.

FIG. 4 illustrates an embodiment of a process for formatting and publishing video stream data. In some embodiments, process 400 is employed by a formatting server such as formatting server 206 of FIG. 2 or formatting server 300 of FIG. 3. Process 400 starts at 402 at which raw video stream data is received. In some embodiments, the raw video stream data comprises live or real time video data. In some such cases, the received video stream comprises an RTSP stream. At 404, the received video stream data is transcoded into a dividable video format file. In some embodiments, the dividable video format file comprises a Flash file. In some cases, a header is included at the beginning of the file, and transcoded data is sequentially appended to the file in the order that it is received. At 406, the transcoded data in the dividable video format file is split into a sequence of one or more small (e.g., Flash) files. For example, the transcoded data may be split into small files of a prescribed size or into small files of a prescribed time duration. In some embodiments, the beginning of the dividable video format file is indicated by the header of the file, which, in some cases, is removed before beginning to split the file at 406, e.g., starting from the top of the file. In some embodiments, the file name assigned to of each of the small files includes a sequence number that identifies the order of that small file relative to other small files. For example, the small files may be sequentially named "part1", "part2", "part3", etc. At 408, the small files generated at 406 are published to one or more nodes of a CDN. In some embodiments, the small files are published at 408 to one or more replicator servers of a CDN so that the replicator servers can publish the small files across one or more nodes of the CDN. In some embodiments, the small files are directly published at 408 to one or more clients. In some embodiments, one or more steps of process 400 are performed in parallel, for example, as video stream data continues to be received at 402 so that the video data can be efficiently and reliably delivered to clients, e.g., as close to real time as possible.

Figure 5:
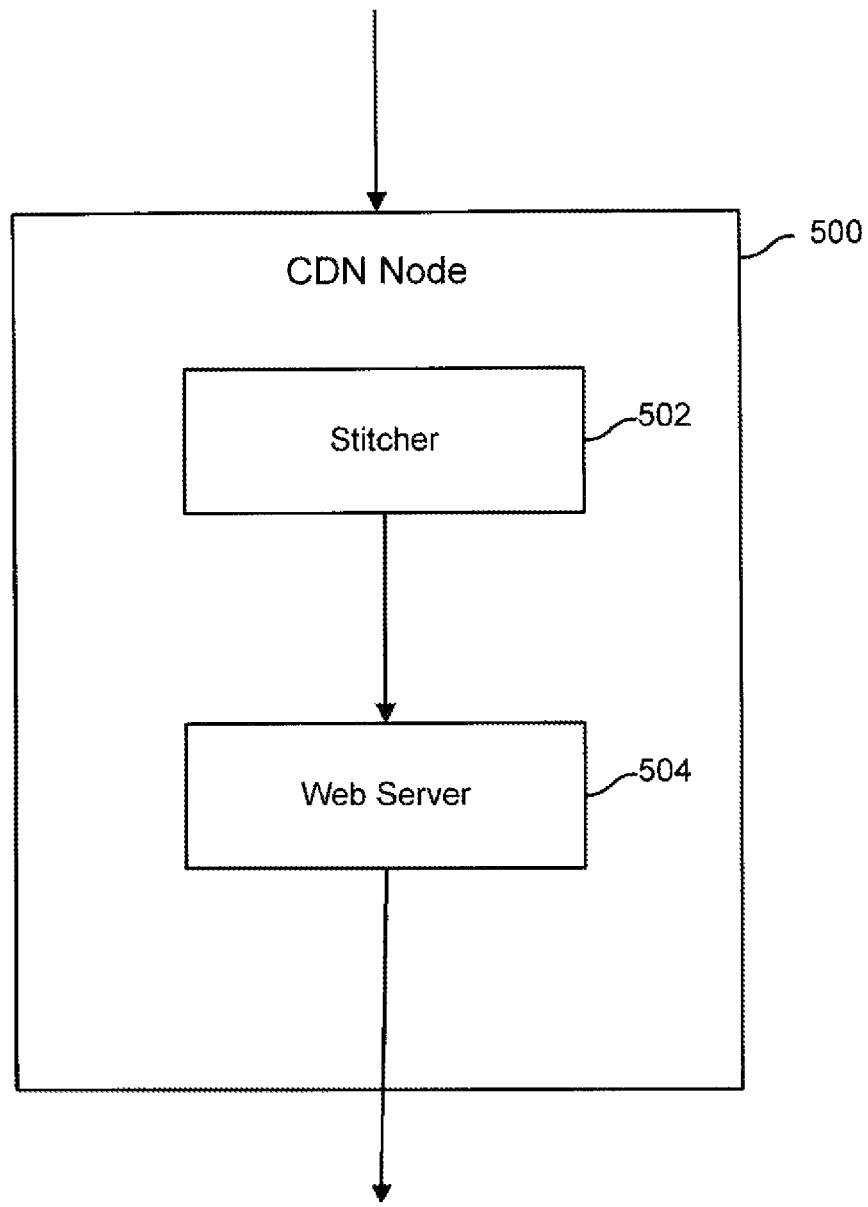
FIG. 5 illustrates an embodiment of a CDN node.

FIG. 5 illustrates an embodiment of a CDN node 500. In some embodiments, node 500 corresponds to node 212 of FIG. 2. In some embodiments, node 500 receives one or more small files that comprise a video stream from a formatting server such as formatting server 206 or 300, for example, when the files are published by the formatting server such as at 408 of process 400 and/or from a replicating server and/or other nodes of a CDN. In some embodiments, node 500 requests one or more small files comprising a video stream from a formatting server and/or one or more other nodes of an associated CDN that have the files when a request for the video stream is received from a client. In some embodiments, the small files comprising the video stream are stored at node 500 in a buffer, other memory location, and/or a persistent storage location. As depicted in the given example, node 500 includes a stitcher 502 and a web server 504, such as an HTTP server. In some embodiments, stitcher 502 provides the small files comprising a video stream to web server 504 in the correct sequential order for delivery to a requesting client. In some embodiments, stitcher 502 provides the small files to web server 504, which subsequently delivers the small files to a requesting client, as portions of a single file.

In some embodiments, stitcher 502 never combines the small files into a single, large file but simply writes out the small files in the correct order. For example, when a request is received by web server 504 from a client for a video stream, stitcher 502 provides to web server 504 for delivery to the client a header of a single (Flash or other dividable video format into which the video stream has been transcoded) file. Subsequently, stitcher 502 sequentially provides to web server 504 for delivery to the client the small files in the correct order based on the sequence numbers assigned to the small files. From the perspective of web server 504 and the client, the small files comprise pieces of the same file, which, for the case of real time video delivery, at least seems to never end since the file is continuously being generated and provided to the client as long as an associated camera continues recording and/or as long as the client desires to receive the file. For real time video delivery, stitcher 502 starts by sequentially providing the most current (e.g., highest sequence numbered) small files available at node 500. In some cases, stitcher 502 may not start with the highest sequence number available (i.e. stitcher 502 may intentionally add a slight delay) so that a buffer of available video data can be maintained to ensure a smooth viewing experience at the client. Upon selecting a starting point (i.e. small file) to begin the video stream with, in some embodiments, stitcher 502 locates the first key frame in that small file or in a sequentially subsequent small file and discards any data prior to that key frame so that the video begins with a key frame for a better viewing experience at the client. In some embodiments, locating the first key frame after a selected starting point is not necessary by stitcher 502, for example, if a file splitter such as file splitter 304 splits at key frames. In some embodiments, a dedicated stitcher 502 is associated with each requesting client, for example, because the video data provided to each client may start at different starting points. In some embodiments, other content such as ads, logos, public service announcements, etc., may be appropriately added to the beginning of the video data, interspersed within the video data, and/or added to the end of the video data. In some embodiments, an ad, logo, public service announcement, static air, etc., may be added when a dead air spot occurs in the video stream, e.g., if the next sequential small file to be delivered is not timely received by node 500.

Figure 6:
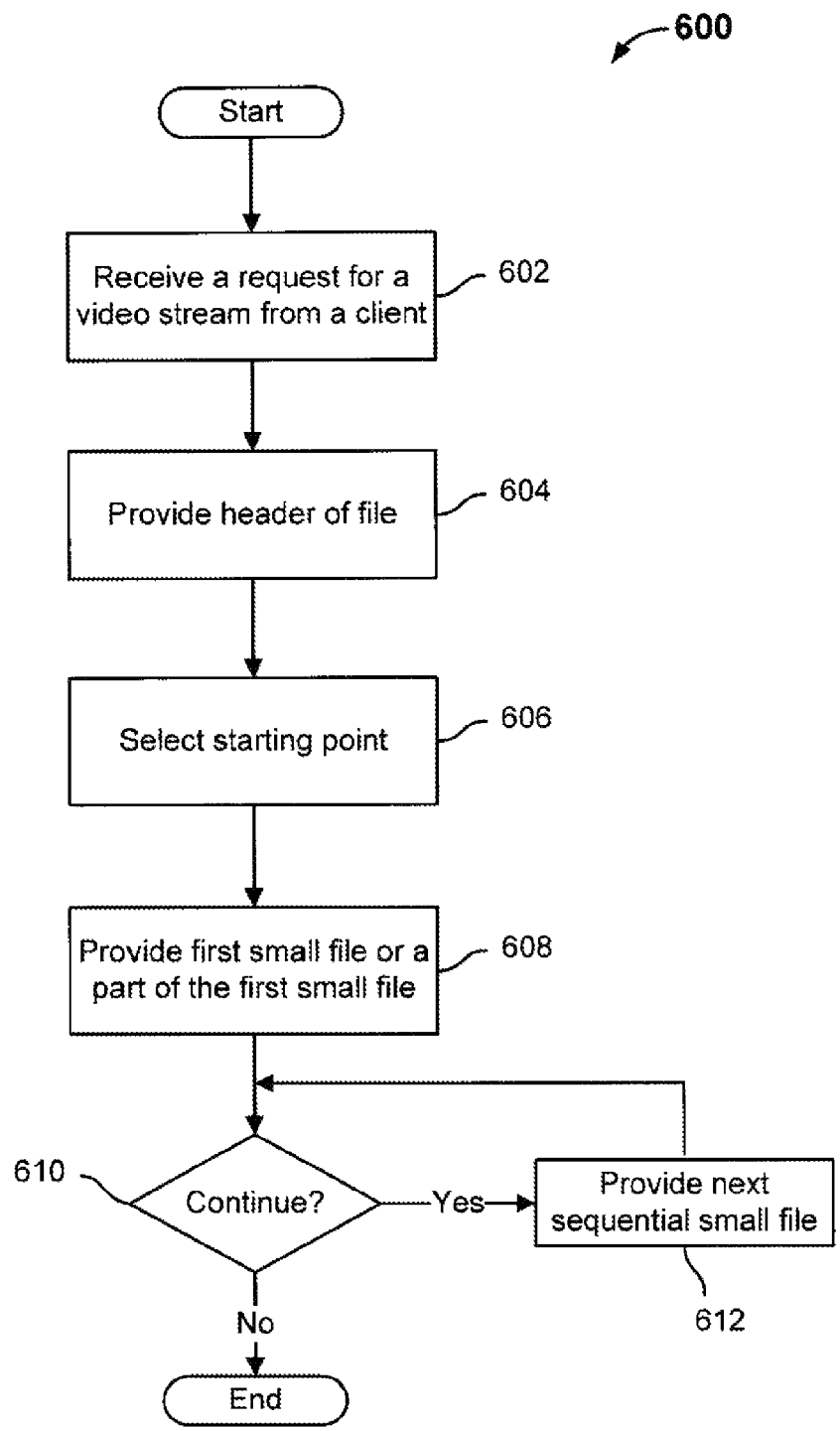
FIG. 6 illustrates an embodiment of a process for providing video data.

FIG. 6 illustrates an embodiment of a process for providing video data. In some embodiments, process 600 is employed by stitcher 502 of FIG. 5. Process 600 starts at 602 at which a request for a video stream is received. For example, the request of 602 may be received by a web server from a client and communicated to a stitcher associated with providing the video stream. In the cases in which a dedicated stitcher is associated with each client, 602 in some embodiments includes assigning an available stitcher to or instantiating a new stitcher for the requesting client. At 604, a header of a video (e.g., Flash) file is provided. In some embodiments, the header is provided by the stitcher to the associated web server for delivery to the client. At 606, the starting point of the video stream for the client is selected. The selected starting point may be based on the sequence numbers of small files comprising the video stream currently available at the CDN node. For example, a small file with a sequence number close to the highest available sequence number at the CDN node may be selected as the starting point. In some embodiments, the small file with the highest available sequence number is selected as the starting point, for example, to provide the video data as close to live or real time as possible. At 608, the first small file or a part of the first small file is provided. In some embodiments, the first small file or a part of the first small file is provided by the stitcher to the associated web server for delivery to the client as the first portion after the header of the file being delivered. In some embodiments, the first small file or a part of the first small file provided at 608 includes data of and/or after the first key frame after the starting point selected at 606. At 610 it is determined whether to continue providing video data. If it is determined at 610 to continue providing video data, the next sequential small file is provided at 612. For example, the next sequential small file is provided by the stitcher to the associated web server for delivery to the client as the next portion of the file being delivered. In some embodiments, if the next sequential small file is not currently available, the stitcher waits for the file to become available before providing it at 612. If it is determined at 610 to not continue providing video data, process 600 ends. For example, it may be determined at 610 to not continue providing video data if the client terminates its connection or, for instance, if no more video data exists, e.g., if an associated camera has stopped recording and the end of the file has already been delivered to the client. In various embodiments, ads, logos, public service announcements, static air, and/or any other content may be inserted at any point of the file.

In some embodiments, web server 504 of node 500 delivers small files comprising a single file to a client as it would deliver portions of any file. In the case of a live or real time video stream, in some embodiments, the size and/or length of the file being delivered to the client is not specified or even known a priori since new video stream data is continuously being captured by an associated camera and formatted for efficient distribution as described. Thus, instead of delivering data that already exists or at least is available at node 500, the data comprising the file is provided as and when it becomes available. A video or media player at the client plays the received (e.g., Flash) portions of the file as it would play portions of any file as it is being downloaded.

In various embodiments, any appropriate type of media player and/or player configuration that supports the file type (e.g., Flash) of the requested video may be employed at a client to view the video data. For instance, the player may be configured to display a plurality of channels and/or camera angles, one or more of which may be (nearly) live. In some embodiments, the video data received at the client may at least in part be buffered for a better viewing experience at the expense of introducing a slight delay. In some embodiments, buffering at the client is achieved by selecting a data transmission rate from the web server to the client that is greater than the viewing rate at the client. In some embodiments, digital video recorder (DVR) capability may be supported. That is, it may be possible to adjust the scrubber of the media player at the client back in time for playback of past video data. In some embodiments, when a scrubber is adjusted back in time, a request for the video file is sent to the web server that includes an offset value associated with the scrubber position. For example, the offset value may specify a byte offset or a time offset. In the cases in which an offset value is specified, the stitcher determines an appropriate starting point based on the offset value. In some embodiments, if the video stream comprises a live or real time video stream, adjusting the scrubber to a future time results in the buffer at the client to be purged and the video file being reloaded and started at a nearly live starting point.

Figure 7:
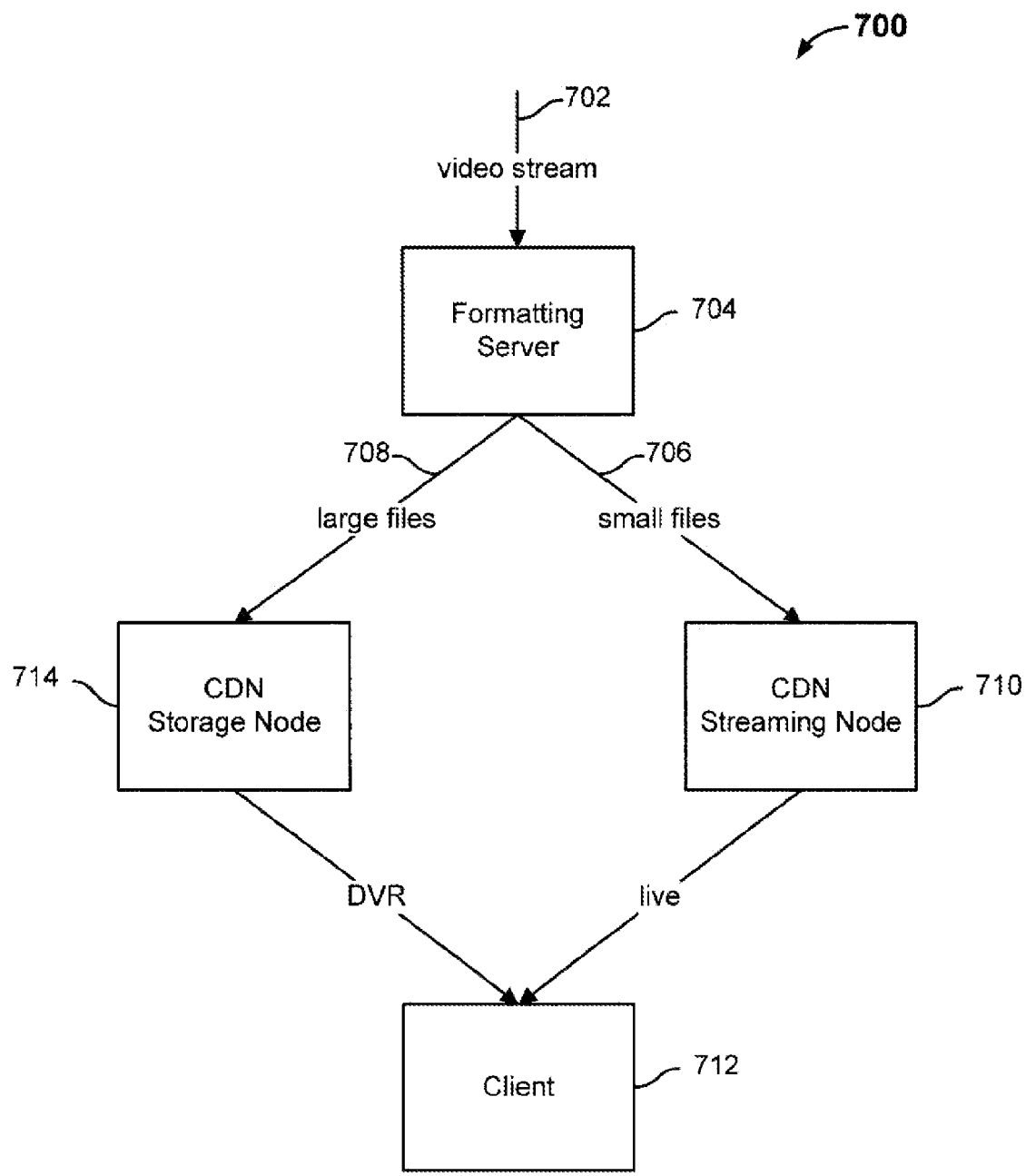
FIG. 7 is a diagram illustrating an embodiment of a network environment of a CDN.

It may not be efficient to store in memory a large number of small files. Rather, it may be desirable to store a smaller number of larger files in long-term or persistent storage that can be used, for example, for DVR functionality. FIG. 7 is a diagram illustrating an embodiment of a network environment 700 of a CDN. An input video stream 702 (e.g., in a real time streaming format such as RTSP) is formatted by formatting server 704 into a sequence of small files 706 and a sequence of large files 708. In some embodiments, the small files 706 and large files 708 may be in different file formats. For example, the small files may be Flash files while the large files may be H.264 files. The sequence of small files 706 is published to one or more CDN live streaming nodes, such as live streaming node 710. In some embodiments, each live streaming node, such as node 710, uses memory to buffer the small files for efficient live video delivery to one or more requesting clients, such as client 712. The sequence of large files 708 is published to one or more CDN storage nodes, such as CDN storage node 714 for efficient long-term or persistent storage. One or more of the sequence of large files 708 may be delivered on-demand from node 714 to client 712 in response to a DVR request from client 712. Thus, different CDN nodes may service a request from a client based on the content requested. In some embodiments, live (or near live) content is provided to a client by a live streaming node of a CDN while older content is provided by a storage node of the CDN.

In some embodiments, a video stream received by a formatting server such as formatting server 206, 300, and/or 704 may be processed by different transcoder/file splitter pairs running at different bit rates so that different qualities (e.g., high, medium, low) of the video stream can be published. When requested by a client, an appropriate quality can be delivered to the client based on the ability of the client to receive and play the data. For example, a speed check may be performed on the client to determine the optimal quality to provide to the client.

In some embodiments, instead of being a part of a CDN node, a stitcher such as stitcher 502 of FIG. 5 may be deployed client-side. In some such cases, for example, the client may be required to use a custom media player that includes a built-in stitcher, and/or the client may employ a standard media player with the stitcher installed as a plugin. In various embodiments, a client-side stitcher may receive the small files comprising the video data in any appropriate manner. For example, the stitcher may receive a stream of small files, for example, as a single arbitrarily long stream or broadcast, and/or the stitcher may request each small file individually either serially or in parallel depending on the number of connections available. The client-side stitcher functions similarly to the server-side stitcher described above, and provides to the player the sequence of small files in the correct order.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for publishing a video stream, comprising:
receiving at a formatting server at least a part of a video stream;
converting at a formatting server the received part of the video stream into a dividable video format;
splitting at a formatting server the dividable video format into a sequence of small files; and
publishing the sequence of small files as one or more portions of a single file to a node of a CDN;
assembling, at the CDN node, the sequence of small files together in a correct order, and
delivering, at the CDN node, the assembled sequence of small files to a web server within the CDN node;
wherein a client request for the single file is at least in part serviceable by providing one or more of the sequence of small files as portions of the single file to the client.

2. The method as recited in claim 1, wherein the video stream comprises a Real Time Streaming Protocol (RTSP) stream.

3. The method as recited in claim 1, wherein the video stream comprises a Real Time Messaging Protocol (RTMP) stream.

4. The method as recited in claim 1, wherein the video stream comprises a real time streaming video format and is received from a video source comprising one or more of a camera, a Real Time Streaming Protocol (RTSP) server, and a Real Time Messaging Protocol (RTMP) server.

5. The method as recited in claim 1, wherein the dividable video format comprises a Flash FLV file.

6. The method as recited in claim 1, wherein the dividable video format is split into small files of a prescribed size.

7. The method as recited in claim 1, wherein the dividable video format is split into small files of a prescribed time duration.

8. The method as recited in claim 1, wherein a sequence number is associated with each small file in the sequence of small files.

9. The method as recited in claim 1, wherein one or more of the sequence of small files is published to one or more clients.

10. The method as recited in claim 1, further comprising delivering one or more of the sequence of small files as portions of the single file to a client.

11. The method as recited in claim 10, further comprising delivering one or more ads, logos, public service announcements, and static air.

12. The method as recited in claim 10, further comprising selecting a starting small file or a part thereof from the sequence of small files with which to begin delivering.

13. The method as recited in claim 1, wherein each of the dividable video format and the single file comprises a continuously growing file in real time.

14. The method as recited in claim 1, further comprising delivering one or more of the sequence of small files to a requesting client wherein the one or more of the sequence of small files are assembled in a correct order client-side.

15. The method as recited in claim 1, further comprising splitting the dividable video format into a sequence of large files.

16. The method as recited in claim 15, further comprising publishing one or more of the sequence of large files to one or more nodes of a content delivery network.

17. The method as recited in claim 15, further comprising delivering one or more of the sequence of large files to a client in response to a request from the client for old data of the video stream.

18. The method as recited in claim 1, wherein one or more of the sequence of small files is published using one or more reliable communication protocols.

19. A system for publishing a video stream, comprising:
a processor; and
a memory coupled to the processor and configured to provide the processor with instructions; wherein the processor is configured to:
receive at least a part of a video stream;
convert the received part of the video stream into a dividable video format;
split the dividable video format into a sequence of small files; and
publish the sequence of small files as portions of a single file to a node of a CDN;
assemble, at the CDN node, the sequence of small files together in a correct order, and deliver, at the CDN node, the assembled sequence of small files to a web server within the CDN node;
wherein a client request for the single file is at least in part serviceable by providing one or more of the sequence of small files as portions of the single file to a client.

20. A system for delivering video data, comprising:
a processor;
a memory coupled to the processor and configured to provide the processor with instructions, wherein said processor is configured to:
receive a sequence of small files, wherein the sequence of small files is generated by splitting at least a part of a dividable video format; and
provide one or more of the sequence of small files to a client as portions of a single file;
assemble, at a CDN node, the sequence of small files together in a correct order, and
deliver, at the CDN node, the assembled sequence of small files to a web server within the CDN node.

* * * * *